(12) United States Patent
Kawagoe et al.

(10) Patent No.: US 9,410,003 B2
(45) Date of Patent: Aug. 9, 2016

(54) POLYOXYALKYLENE-MODIFIED VINYL ACETAL POLYMER, AND COMPOSITION COMPRISING SAME

(75) Inventors: Masako Kawagoe, Kurashiki (JP); Shinsuke Nii, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 340 days.

(21) Appl. No.: 14/001,569

(22) PCT Filed: Feb. 24, 2012

(86) PCT No.: PCT/JP2012/054545
§ 371 (c)(1),
(2), (4) Date: Aug. 26, 2013

(87) PCT Pub. No.: WO2012/115223
PCT Pub. Date: Aug. 30, 2012

(65) Prior Publication Data
US 2013/0338306 A1    Dec. 19, 2013

(30) Foreign Application Priority Data

Feb. 25, 2011 (JP) ................................. 2011-040140

(51) Int. Cl.
| | | |
|---|---|---|
| C08L 29/04 | (2006.01) | |
| C08L 29/14 | (2006.01) | |
| C08F 116/38 | (2006.01) | |
| C08F 16/38 | (2006.01) | |
| C08F 8/48 | (2006.01) | |
| C08F 218/08 | (2006.01) | |
| C08F 8/10 | (2006.01) | |
| C08F 216/38 | (2006.01) | |
| C08F 220/58 | (2006.01) | |
| C08F 216/14 | (2006.01) | |

(52) U.S. Cl.
CPC .................. C08F 116/38 (2013.01); C08F 8/10 (2013.01); C08F 8/48 (2013.01); C08F 16/38 (2013.01); C08F 218/08 (2013.01); C08L 29/14 (2013.01); C08F 216/1416 (2013.01); C08F 216/38 (2013.01); C08F 220/58 (2013.01)

(58) Field of Classification Search
CPC .............. C08F 16/38; C08F 8/48; C08F 8/10; C08F 218/08; C08F 116/38; C08L 29/14
USPC ............................................ 524/557; 525/61
See application file for complete search history.

(56) References Cited

U.S. PATENT DOCUMENTS

| | | | | |
|---|---|---|---|---|
| 3,218,281 | A * | 11/1965 | Rees ......................... | C08F 2/30 524/457 |
| 5,019,624 | A | 5/1991 | Gutweiler et al. | |
| 2005/0025913 | A1 | 2/2005 | Jikihara et al. | |
| 2007/0249770 | A1 | 10/2007 | Fukui et al. | |
| 2009/0093609 | A1 | 4/2009 | Shibutani et al. | |
| 2013/0267647 | A1 | 10/2013 | Tsujimoto et al. | |
| 2014/0178609 | A1 | 6/2014 | Kawagoe et al. | |

FOREIGN PATENT DOCUMENTS

| | | |
|---|---|---|
| EP | 1 500 669 A2 | 1/2005 |
| EP | 2 006 308 A1 | 12/2008 |
| EP | 2 623 525 A1 | 8/2013 |
| EP | 2 735 557 A1 | 5/2014 |
| JP | 1 259057 | 10/1989 |
| JP | 2 300209 | 12/1990 |
| JP | 5 295016 | 11/1993 |
| JP | 6 263521 | 9/1994 |
| JP | 2003 192450 | 7/2003 |
| JP | 2006-104309 | 4/2006 |
| JP | 2007-297613 | 11/2007 |
| JP | 2009 1631 | 1/2009 |
| WO | 2005 123830 | 12/2005 |
| WO | WO 2010/113567 A1 | 10/2010 |

OTHER PUBLICATIONS

The Extended European Search Report issued Jul. 18, 2014, in Application No. / Pat. No. 12749280.9-1301 / 2679610.
U.S. Appl. No. 14/234,281, filed Jan. 22, 2014, Kawagoe, et al.
International Search Report Issued May 29, 2012 in PCT/JP12/054545 Filed Feb. 24, 2012.

* cited by examiner

*Primary Examiner* — Alexa Neckel
*Assistant Examiner* — Marie Reddick
(74) *Attorney, Agent, or Firm* — Oblon, McClelland, Maier & Neustadt, L.L.P

(57) ABSTRACT

There is provided a polyoxyalkylene-modified vinyl acetal polymer which has polyoxyalkylene groups represented by general formula (I) in side chain, in which a viscosity-average polymerization degree P is 150 to 5000, an acetalization degree is 10 to 85 mol % and a polyoxyalkylene modification rate S is 0.1 to 10 mol %. Such a polymer has a feature that a film or sheet produced therefrom has improved film strength and flexibility, as well as a feature that a resin composition therefrom is free from phase separation.

(I)

wherein $R^1$ represents a hydrogen atom or a methyl group, $R^2$ represents a hydrogen atom or an alkyl group having 1 to 8 carbon atoms, and $1 \leq m \leq 10$ and $3 \leq n \leq 20$.

16 Claims, No Drawings

POLYOXYALKYLENE-MODIFIED VINYL ACETAL POLYMER, AND COMPOSITION COMPRISING SAME

CROSS REFERENCE TO RELATED APPLICATIONS

The present application is a 35 U.S.C. §371 national stage patent application of International patent application PCT/JP2012/054545, filed on Feb. 24, 2012, published as WO/2012/115223 on Aug. 30, 2012, the text of which is incorporate by reference, and claims the benefit of the filing date of Japanese application no. 2011-040140, filed on Feb. 25, 2011, the text of which is also incorporated by reference.

TECHNICAL FIELD

The present invention relates to a polyoxyalkylene-modified vinyl acetal polymer exhibiting excellent plasticity, a producing process therefore, and a composition comprising the polymer. This invention also relates the use of the composition.

BACKGROUND ART

Vinyl acetal polymers as represented by a vinyl butyral polymer have been used in various applications such as an intermediate film for a laminated glass and inks, paints, enamels for baking, wash primers, lacquers, dispersants, adhesives, ceramic green sheets, heat developing photosensitive materials, binders for a water-based ink demand layer and the like because such polymers are excellent in toughness, film forming properties, dispersion of an inorganic or organic powder such as a pigment in the polymer, adhesiveness to a coated surface and the like. The major reason for the use of a vinyl acetal polymer in various applications is that hydroxyl groups in the vinyl acetal polymer form hydrogen bondings, resulting in toughness of the polymer. On the other hand, such hydrogen bondings lead to somewhat poor flexibility.

Furthermore, a vinyl butyral polymer has a high glass transition temperature and less fluid even at a high temperature. Therefore, for thermoforming, an external plasticizer such as a phthalate of an alcohol having 6 to 10 carbon atoms, triethyleneglycol di-n-heptanoate, tri(2-ethylhexyl) phosphate and tricresyl phosphate is added to the polymer. If the plasticizer is not properly selected, phase separation may occur between the vinyl butyral polymer and the plasticizer, or contact of a composition containing the vinyl butyral polymer and the plasticizer with a solvent may cause elution of the composition, leading to significant variation in composition properties. Specifically, film strength, transparency and storage stability of a film or sheet produced by processing a vinyl butyral polymer may be deteriorated, or an ink may bleed on the surface of the film or the sheet after printing. They have been attempts for an internal plasticized vinyl acetal polymer for preventing deterioration in physical properties due to addition of a large amount of a plasticizer as described above and deterioration of physical properties due to bleeding or migration to another resin of the plasticizer.

Patent Reference No. 1 has described a ceramic slurry for molding a green sheet comprising a polyvinyl acetal resin prepared by acetalizing a modified polyvinyl alcohol having monomer unit containing a polyoxyalkylene (hereinafter, sometimes abbreviated as "POA") group with an aldehyde, a ceramic powder, a plasticizer and an organic solvent. The polyvinyl acetal resin is believed to satisfactorily disperse a ceramic powder because the resin is contained as a solution in an organic solvent. It is also described that POA groups in a side chains in the polyvinyl acetal resin have internal plasticization effect, and that a green sheet produced using the polyvinyl acetal resin exhibits improved flexibility. However, the POA groups described in Patent Reference No. 1 are comprised of a single POA unit mainly including a polyoxyethylene group or a polyoxypropylene group. There is a problem that when a polyvinyl acetal resin having such a polyoxyalkylene group is processed into a film or a sheet, a resulting film or sheet becomes cloudy. Furthermore, a green sheet produced using a polyvinyl acetal resin having such POA groups has insufficient flexibility and unsatisfactorily disperses a ceramic powder.

Patent Reference No. 2 has described a vinyl acetal polymer produced by acetalizing a vinyl alcohol polymer (hereinafter, sometimes abbreviated as "PVA") with a terminally etherized oxyethylene aldehydes/oxyalkanals. It is known that the polymer has features that it contains vinyl alcohol units in a high content, can be used for thermoforming without adding an external plasticizer and is highly adhesive to a metal and a glass. There is, however, a problem that a film or sheet produced by processing the vinyl acetal polymer thus produced becomes cloudy due to the remaining unreacted oxyethylene aldehydes/oxyalkanals in the vinyl acetal polymer.

To date, there have not been provided vinyl acetal polymers which exhibit internal plasticity while being highly tough and avoid phase separation when a resin composition is prepared from the polymer.

PRIOR ART REFERENCES

Patent References

Patent Reference No. 1: Japanese published unexamined application No. 1994-263521.

Patent Reference No. 2: Japanese published unexamined application No. 1990-300209.

Problem to be Solved by the Invention

In view of the current situation described above, an objective of the present invention is to provide a vinyl acetal polymer which gives a film or sheet exhibiting excellent film strength and flexibility and also avoids phase separation when a resin composition is prepared from the polymer.

Means for Solving Problem

We have found that a polyoxyalkylene (hereinafter, sometimes abbreviated as "POA")-modified vinyl acetal polymer which comprises a polyoxyalkylene group (hereinafter, sometimes abbreviated as "POA group") represented by general formula (I) in a side chain, and which has a viscosity-average polymerization degree P of 150 or more and 5000 or less, an acetalization degree of 10 mol % or more and 85 mol % or less, and a polyoxyalkylene modification rate (hereinafter, sometimes abbreviated as "POA group modification rate") S of 0.1 to 10 mol %, gives a film or sheet exhibiting excellent film strength and plasticity and also avoids phase separation when a resin composition is prepared from the polymer.

[Chemical formula 1]

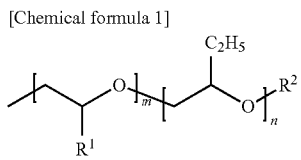

wherein $R^1$ represents a hydrogen atom or a methyl group; $R^2$ represents a hydrogen atom or an alkyl group having 1 to 8 carbon atoms; and $1 \leq m \leq 10$ and $3 \leq n \leq 20$.

The POA-modified vinyl acetal polymer is preferably produced by acetalizing a polyoxyalkylene-modified vinyl alcohol polymer (hereinafter, sometimes abbreviated as "POA-modified PVA") which comprises the polyoxyalkylene group represented by general formula (I) in a side chain, and which has a viscosity-average polymerization degree P of 150 to 5000, a saponification degree of 20 to 99.99 mol % and a POA-group modification rate S of 0.1 to 10 mol %.

The present invention also includes a composition comprising the above POA-modified vinyl acetal polymer. The present invention also includes a slurry composition for a ceramic green sheet, comprising the above POA-modified vinyl acetal polymer, a ceramic powder and an organic solvent. The present invention further includes a ceramic green sheet produced by using the slurry composition for a ceramic green sheet. The present invention also includes a laminate capacitor produced by using the ceramic green sheet.

The present invention relates to a process for producing the polyoxyalkylene-modified vinyl acetal polymer as claimed in claim 1 or 2, comprising copolymerizing an unsaturated monomer represented by general formula (II) with a vinyl ester monomer;

saponifying the polyoxyalkylene-modified vinyl ester copolymer (hereinafter, sometimes abbreviated as "POA-modified vinyl ester copolymer") obtained; and acetalizing the POA-modified vinyl alcohol polymer obtained.

[Chemical formula 2]

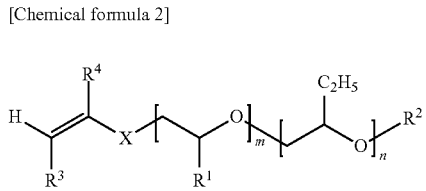

wherein $R^1$, $R^2$, m and n are as defined in general formula (I); $R^3$ represents a hydrogen atom or a —COOM group, wherein M represents a hydrogen atom, an alkali metal or an ammonium group; $R^4$ represents a hydrogen atom, a methyl group or a —CH$_2$—COOM group, wherein M is as defined above; and X represents —O—, —CH$_2$—O—, —CO—, —(CH$_2$)$_k$—, —CO—O—, —CO—NR$^5$— or —CO—NR$^5$—CH$_2$—, wherein $R^5$ represents a hydrogen atom or a saturated alkyl group having 1 to 4 carbon atoms and $1 \leq k \leq 15$.

Here, the unsaturated monomer represented by general formula (II) is preferably an unsaturated monomer represented by general formula (III).

[Chemical formula 3]

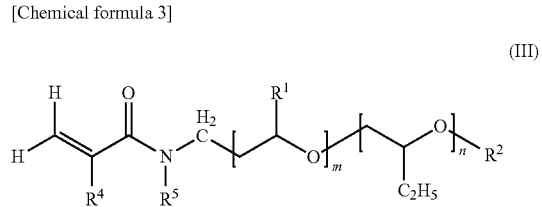

wherein $R^1$, $R^2$, $R^4$, $R^5$, m and n are as defined in general formula (II).

Advantage of the Invention

A POA-modified vinyl acetal polymer of the present invention is characterized by internal plasticization (having a low glass-transition temperature), and has a feature that when being used as a binder for various applications, it has high mechanical strength and high plasticity as well as high dispersibility. Furthermore, since a POA-modified vinyl acetal polymer of the present invention is internally plasticized, it can be thermoformed with a less amount of plasticizer. Thus, when a film or sheet prepared from the POA-modified vinyl acetal polymer is used, the problems of deterioration in physical properties due to addition of a large amount of a plasticizer, bleed out of a plasticizer and migration of a plasticizer to another resin can be solved.

BEST MODE FOR CARRYING OUT THE INVENTION

There are no particular restrictions to a process for producing a POA-modified vinyl acetal polymer of the present invention, but suitably it can be produced by acetalizing a POA-modified PVA. There will be described a POA-modified PVA.

A POA-modified PVA used in the present invention contains POA groups represented by general formula (I) in its side chains.

[Chemical formula 4]

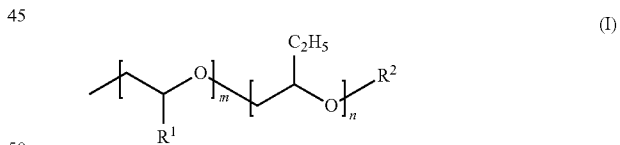

In this formula, $R^1$ represents a hydrogen atom or a methyl group, and $R^2$ represents a hydrogen atom or an alkyl group having 1 to 8 carbon atoms. $1 \leq m \leq 10$, and $3 \leq n \leq 20$. Here, the unit having a repeating unit number of m is referred to as "unit A", and the unit having a repeating unit number of n is referred to as "unit B". Unit A and unit B can be arranged in a random, block or tapered form.

The repeating unit number "m" of unit A in the POA group represented by general formula (I) must be $1 \leq m \leq 10$, preferably $1 \leq m \leq 5$, more preferably $1 \leq m \leq 2$. If m is less than 1, the POA group becomes so hydrophobic that water solubility of the POA-modified PVA is reduced, which makes it difficult to conduct an acetalization reaction in an aqueous solution. The repeating unit number "n" of unit B must be $3 \leq n \leq 20$, preferably $5 \leq n \leq 18$, more preferably $8 \leq n \leq 15$. If n is less than 3, interaction between the POA groups fails to occur and internal plasticization is not effected in a resulting POA-modified vinyl acetal polymer. On the other hand, if n is more than 20, the POA group becomes so hydrophobic that water solubility of the POA-modified PVA is reduced, which makes it difficult to conduct an acetalization reaction in an aqueous solution.

There are no particular restrictions to a process for producing the POA-modified PVA, but it is preferably produced by copolymerizing an unsaturated monomer having a POA group represented by general formula (I) with a vinyl ester monomer and saponifying a resulting POA-modified vinyl ester copolymer. Here, the above copolymerization is suitably conducted in an alcoholic solvent or in a neat system.

An unsaturated monomer having a POA group represented by general formula (I) is preferably an unsaturated monomer represented by general formula (II).

[Chemical formula 5]

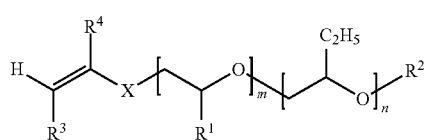

(II)

In this formula, $R^1$, $R^2$, m, n is as defined in general formula (I). $R^3$ represents a hydrogen atom or a —COOM, where M is a hydrogen atom, an alkali metal or an ammonium group. $R^4$ represents a hydrogen atom, a methyl group or a —$CH_2$—COOM group, where M is as defined above. X represents —O—, —$CH_2$—O—, —CO—, —$(CH_2)_k$—, —CO—O—, —CO—$NR^5$— or —CO—$NR^5$—$CH_2$—. If X is asymmetric, its direction is not restricted. Here, $R^5$ represents a hydrogen atom or a saturated alkyl group having 1 to 4 carbon atoms, and $1 \leq k \leq 15$.

$R^2$ in the unsaturated monomer represented by general formula (II) is preferably a hydrogen atom, a methyl group or a butyl group, more preferably a hydrogen atom or a methyl group. Furthermore, $R^2$ in the unsaturated monomer represented by general formula (II) is a hydrogen atom or a methyl group, and $R^3$ is particularly preferably a hydrogen atom.

For example, when $R^1$ in general formula (II) is a hydrogen atom or a methyl group, $R^2$ is a hydrogen atom and $R^3$ is a hydrogen atom, then the unsaturated monomer represented by general formula (II) can be selected from polyoxyalkylene mono(meth)acrylamides, polyoxyalkylene mono(meth)allyl ethers, polyoxyalkylene monovinyl ethers and polyoxyalkylene mono(meth)acrylates; specific examples include polyoxyethylene polyoxybutylene monoacrylamide, N-methylene polyoxyethylene polyoxybutylene monoacrylamide, polyoxyethylene polyoxybutylene monomethacrylamide, N-methylene polyoxyethylene polyoxybutylene monomethacrylamide, polyoxypropylene polyoxybutylene monoacrylamide, N-methylene polyoxypropylene polyoxybutylene monoacrylamide, polyoxypropylene polyoxybutylene monomethacrylamide, N-methylene polyoxypropylene polyoxybutylene monomethacrylamide, polyoxyethylene polyoxybutylene monoallyl ether, polyoxyethylene polyoxybutylene monomethallyl ether, polyoxypropylene polyoxybutylene monoallyl ether, polyoxypropylene polyoxybutylene monomethallyl ether, polyoxyethylene polyoxybutylene monovinyl ether, polyoxypropylene polyoxybutylene monovinyl ether, polyoxyethylene polyoxybutylene monoacrylate, polyoxyethylene polyoxybutylene monomethacrylate, polyoxypropylene polyoxybutylene monoacrylate, and polyoxypropylene polyoxybutylene monomethacrylate. Among these, polyoxyethylene polyoxybutylene monoacrylamide, N-methylene polyoxyethylene polyoxybutylene monoacrylamide, polyoxyethylene polyoxybutylene monomethacrylamide, N-methylene polyoxyethylene polyoxybutylene monomethacrylamide and polyoxyethylene polyoxybutylene monovinyl ether are suitably used, and polyoxyethylene polyoxybutylene monomethacrylamide, N-methylene polyoxyethylene polyoxybutylene monoacrylamide and polyoxyethylene polyoxybutylene monovinyl ether are particularly suitably used.

When $R^2$ in general formula (II) is an alkyl group having 1 to 8 carbon atoms, a specific example of an unsaturated monomer represented by general formula (II) is the unsaturated monomer illustrated when $R^2$ in general formula (II) is a hydrogen atom, in which a terminal OH group is replaced with an alkoxy group having 1 to 8 carbon atoms. Among these, unsaturated monomers such as polyoxyethylene polyoxybutylene monomethacrylamide, N-methylene polyoxyethylene polyoxybutylene monoacrylamide and polyoxyethylene polyoxybutylene monovinyl ether in which a terminal OH group is replaced with a methoxy group are suitably used: and unsaturated monomers such as polyoxyethylene polyoxybutylene monomethacrylamide and N-methylene polyoxyethylene polyoxybutylene monoacrylamide in which a terminal OH group is replaced with a methoxy group are particularly suitably used.

Among these, the unsaturated monomer represented by general formula (II) is particularly preferably an unsaturated monomer represented by general formula (III).

[Chemical formula 6]

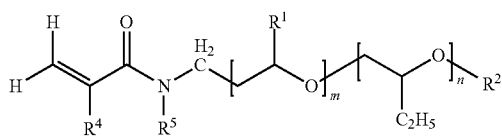

(III)

In this formula, $R^1$, $R^2$, $R^4$, $R^5$, m and n are as defined in general formula (II).

A temperature during copolymerization of an unsaturated monomer having POA groups represented by general formula (I) with a vinyl ester monomer is preferably 0 to 200° C., more preferably 30 to 140° C. If the copolymerization is conducted at a temperature lower than 0° C., the polymerization cannot proceed in an adequate rate. If the polymerization temperature is higher than 200° C., a POA-modified PVA having a POA-group modification rate as defined by the present invention cannot be obtained. A temperature during the copolymerization can be controlled to 0 to 200° C., for example, by making a balance between heat generated from the polymerization and heat dissipation from the surface of a reactor by means of controlling a polymerization rate and by controlling a temperature using an external jacket with a proper heat medium, and in the light of safety, the latter method is preferable.

The copolymerization of an unsaturated monomer having POA groups represented by general formula (I) with a vinyl ester monomer can be conducted by any polymerization style such as batch polymerization, semi-batch polymerization, continuous polymerization and semi-continuous polymerization. The polymerization method can be any known method such as bulk polymerization, solution polymerization, suspension polymerization and emulsion polymerization.

Among these, bulk polymerization or solution polymerization in which polymerization is conducted in a neat system or in an alcoholic solvent is suitably employed, and for the purpose of producing a copolymer with a high polymerization degree, emulsion polymerization is employed. Examples of the alcoholic solvent can include, but not limited to, methanol, ethanol and n-propanol. These solvents can be used in combination of two or more.

An initiator used for the copolymerization can be appropriately selected from known azo initiators, peroxide initiators and redox initiators depending on a polymerization method. Examples of an azo initiator include 2,2'-azobisisobutyronitrile, 2,2'-azobis(2,4-dimethylvaleronitrile) and 2,2'-azobis(4-methoxy-2,4-dimethylvaleronitrile); examples of a peroxide initiator include percarbonates such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetylcyclohexylsulfonyl peroxide; and 2,4,4-trimethylpentyl-2-peroxyphenoxy acetate. Furthermore, the above initiator can be combined with, for example, potassium persulfate, ammonium persulfate or hydrogen peroxide, to be an initiator. Furthermore, a redox initiator can be a combination of the above peroxide with a reducing agent such as sodium bisulfite, sodium hydrogen carbonate, tartaric acid, L-ascorbic acid and Rongalite.

When an unsaturated monomer having POA groups represented by general formula (I) is copolymerized with a vinyl ester monomer at a high temperature, PVA may be colored due to decomposition of a vinyl ester monomer. Thus, in such a case, it is allowed to add an antioxidizing agent such as tartaric acid to the polymerization system in an amount of about 1 to 100 ppm (based on a vinyl ester monomer) for preventing staining.

Examples of the vinyl ester monomer include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate and vinyl benzoate, inter alia, most preferably vinyl acetate.

When an unsaturated monomer having POA groups represented by general formula (I) is copolymerized with a vinyl ester monomer, another monomer can be involved in the copolymerization as long as it does not impair the spirit of the present invention. Examples of a monomer which can be used include α-olefins such as ethylene, propylene, n-butene and isobutylene; acrylic acid and its salts; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and its salts; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acrylamide, N-methylacrylamide, N-ethylacrylamide, N,N-dimethylacrylamide, diacetone acrylamide, acrylamidopropanesulfonic acid and its salts, acrylamidopropyldimethylamine and its salts or quaternary salts, and N-methylolacrylamide and its derivatives; methacrylamide derivatives such as methacrylamide, N-methylmethacrylamide, N-ethylmethacrylamide, methacrylamidopropanesulfonic acid and its salts, methacrylamidopropyldimethylamine and its salts or quaternary salts, N-methylolmethacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxyropane; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated dicarboxylic acids such as maleic acid, itaconic acid and fumaric acid, and their salts, esters or anhydrides; vinylsilyl compounds such as vinyltrimethoxysilane; and isopropenyl acetate. These monomers can be generally used in a proportion of less than 10 mol % based on vinyl ester monomer.

When an unsaturated monomer having POA groups represented by general formula (I) is copolymerized with a vinyl ester monomer, the copolymerization can be conducted in the presence of a chain transfer agent for adjusting a polymerization degree of the resulting copolymer and so on as long as it does not impair the spirit of the present invention. Examples of a chain transfer agent include aldehydes such as acetaldehyde and propionaldehyde; ketones such as acetone and methyl ethyl ketone; mercaptans such as 2-hydroxyethanethiol; halogenated hydrocarbons such as trichloroethylene and perchloroethylene; and phosphinic acid salts such as sodium phosphinate monohydrade, and, inter alia, aldehydes and ketones can be suitably used. The amount of the chain transfer agent depends on a chain transfer constant of the chain transfer agent added and a polymerization degree of a targeted vinyl ester polymer, and generally it is desirably 0.1 to 10% by weight based on the vinyl ester monomer.

For saponification of a POA-modified vinyl ester copolymer, well-known alcoholysis or hydrolysis using a basic catalyst such as sodium hydroxide, potassium hydroxide and sodium methoxide or an acidic catalyst such as p-toluenesulfonic acid can be employed. Examples of a solvent which can be used in such a reaction include alcohols such as methanol and ethanol; esters such as methyl acetate and ethyl acetate; ketones such as acetone and methyl ethyl ketone; and aromatic hydrocarbons such as benzene and toluene, which can be used alone or in combination of two or more. Particularly, it is convenient and preferable that the saponification is effected using methanol or a mixed solution of methanol/methyl acetate as a solvent and sodium hydroxide as a catalyst.

In a POA-modified PVA used in the present invention, a POA-group modification rate S is preferably 0.1 to 10 mol %. POA-group modification rate S is expressed as a molar fraction of POA groups to methylene groups in a main chain of the PVA. A monomer unit constituting a POA-modified PVA has one methylene group in a main chain per one monomer unit. In other words, a POA-group modification rate S of a POA-modified PVA is a molar proportion (mol %) of units derived from an unsaturated monomer having POA groups represented by general formula (I) to the molar number of the total monomer units constituting the POA-modified PVA. If a POA-group modification rate S is more than 10 mol %, a proportion of hydrophobic groups contained in one POA-modified PVA molecule is so high that water solubility of the PVA may be reduced, making it difficult to effect an acetalization reaction in an aqueous solution. A POA-group modification rate S is more preferably less than 2 mol %, further preferably 1.5 mol % or less. If a POA-group modification rate S is less than 0.1 mol %, water solubility of a POA-modified PVA is satisfactory, but the number of POA groups in the PVA may be inadequate to express physical properties based on POA modification. A POA-group modification rate S is more preferably 0.2 mol % or more.

A POA-group modification rate S of a POA-modified PVA can be determined from a proton NMR of the PVA. When a POA-modified vinyl ester polymer is saponified to produce a POA-modified PVA, a proportion (mol %) of the molar number of the units derived from an unsaturated monomer having POA groups represented by general formula (I) to the molar number of the total monomer units in one molecule is unchanged before and after saponification. A POA-group modification rate S of a POA-modified PVA can be, therefore, determined from a proton NMR of a POA-modified vinyl ester polymer as a precursor.

When a POA-modified PVA exactly consists of vinyl alcohol units, vinyl ester units and units derived from an unsaturated monomer having POA groups represented by general formula (I), for example, a POA-group modification rate S of the POA-modified PVA can be calculated by measuring a POA-modified vinyl ester copolymer as a precursor by the method described below. First, the POA-modified vinyl ester copolymer is thoroughly purified by three or more reprecipitation processes from n-hexane/acetone, and then dried under a reduced pressure at 50° C. for 2 days, to prepare a sample of the POA-modified vinyl ester copolymer for analysis. The sample is dissolved in $CDCl_3$, and is subjected to analysis with a 500 MHz proton NMR apparatus (JEOL GX-500) at room temperature. A POA-group modification rate S is calculated from an area of peak α (4.7 to 5.2 ppm) from methyne in a main chain of a vinyl ester monomer unit to an area of peak β (0.8 to 1.0 ppm) from a terminal methyl group in unit B, using the following equation. Here, n in the equation refers to the number of repeating units in unit B.

POA-group modification rate $S$(mol %)={(the area of peak β/3n)/(the area of peak α+(the area of peak β/3n)}×100

A viscosity-average polymerization degree P of a POA-modified PVA used in the present invention is determined in accordance with JIS K6726. Specifically, the PVA is re-saponified and purified, and is measured for its limiting viscosity [η] (unit: deciliter/g) in water at 30° C., from which P is calculated by the following equation. When a mixture of two or more PVAs is used as a POA-modified PVA, an apparent viscosity-average polymerization degree of the whole PVA after mixing is used as a viscosity-average polymerization degree P. Here, a viscosity-average polymerization degree is sometimes simply referred to as "polymerization degree".

Viscosity-average polymerization degree $P=([\eta] \times 10^3/8.29)^{(1/0.62)}$ A polymerization degree P of a POA-modified PVA used in the present invention is preferably 150 to 5000. A polymerization degree P of more than 5000 is impractical because productivity of the POA-modified PVA is reduced. Furthermore, when a polymerization degree is less than 150, internal plasticity of a POA-modified vinyl acetal polymer produced using the POA-modified PVA becomes excessively high, and consequently a sheet or film produced from the polymer may be inadequately strong although it exhibits adequate plasticity. The lower limit of a polymerization degree P of the POA-modified PVA is more preferably 200, more preferably 500, particularly preferably 800, most preferably 1000. Meanwhile, the upper limit of a polymerization degree P of the POA-modified PVA is more preferably 4500, further preferably 3500.

A saponification degree of the POA-modified PVA is preferably 20 to 99.99 mol %, more preferably 40 to 99.9 mol %, further preferably 77 to 99.9 mol %, particularly preferably 80 to 99.9 mol %. If a saponification degree is less than 20 mol %, water solubility of the POA-modified PVA is so reduced that an aqueous solution of the POA-modified PVA cannot be prepared and thus a modified vinyl acetal polymer cannot be produced in an aqueous solution. A saponification degree of more than 99.99 mol % is impractical because the POA-modified PVA is difficult to be produced. The saponification degree of a POA-modified PVA described above is measured in accordance with JIS K6726.

A content of the monomer units having POA groups represented by general formula (I) in a POA-modified PVA is preferably 50 parts by weight or less, more preferably 30 parts by weight or less, particularly preferably 15 parts by weight or less. If a content of the monomer units having a POA groups is more than 50 parts by weight, the PVA becomes so hydrophobic that its solubility in an aqueous solvent may be reduced. The lower limit of the content is preferably 2.5 parts by weight.

Here, a content of the monomer units having POA groups represented by general formula (I) is expressed as the monomer units having POA groups in parts by weight to 100 parts by weight of the main chain of PVA (mass fraction), which can be calculated using the above POA-group modification rate S, the repeating unit number "m" of unit A, the repeating unit number "n" of unit B and a saponification degree of the POA-modified PVA. Even when the POA-group modification rate S described above is equal, as a saponification degree increases or m or n increases, a content of the monomer units having POA group increases.

In a POA-modified vinyl acetal polymer of the present invention, an acetalization degree must be 10 to 85 mol %, and is preferably 35 mol % or more, particularly preferably 50 mol % or more. If an acetalization degree is less than 10 mol %, the polymer is difficult to be industrially produced, leading to reduction in productivity. If an acetalization degree is more than 85 mol %, the polymer cannot be industrially produced in the light of reactivity, and furthermore, residual hydroxyl groups are so reduced that toughness of a POA-modified vinyl acetal polymer is lost. An acetalization degree of the POA-modified vinyl acetal polymer can be adjusted by appropriately adjusting the amount of an aldehyde to the POA-modified PVA, a reaction time after adding the aldehyde and an acid catalyst and the like.

Here, an acetalization degree of a POA-modified vinyl acetal polymer is a proportion of acetalized vinyl alcohol units to the total monomer units constituting the POA-modified vinyl acetal polymer, and can be calculated from a spectrum obtained by proton NMR spectroscopy for a solution of the POA-modified vinyl acetal polymer in DMSO-$d_6$ (dimethylsulfoxide) as a sample.

A viscosity-average polymerization degree P of a POA-modified vinyl acetal polymer of the present invention must be 150 to 5000. If a polymerization degree P of the POA-modified vinyl acetal polymer is less than 150, a sheet or film such as a thin ceramic green sheet produced may have inadequate mechanical strength. Meanwhile, if a polymerization degree P of the POA-modified vinyl acetal polymer is more than 5000, it is insufficiently dissolved in an organic solvent and a solution viscosity becomes so high that coating properties and dispersibility are deteriorated. The lower limit of a polymerization degree P of the POA-modified vinyl acetal polymer is preferably 200, more preferably 500, further preferably 800, particularly preferably 1000. Meanwhile, the upper limit of a polymerization degree P in the modified vinyl acetal polymer is preferably 4500, more preferably 3500.

A viscosity-average polymerization degree P of a POA-modified vinyl acetal polymer can be determined from a viscosity-average polymerization degree of a POA-modified PVA used for producing the POA-modified vinyl acetal polymer. That is, since a polymerization degree is unchanged after acetalization, a polymerization degree of the POA-modified PVA is equal to a polymerization degree of a POA-modified vinyl acetal polymer as its acetalization product. A viscosity-average polymerization degree of a POA-modified PVA means a viscosity-average polymerization degree determined in accordance with JIS K6726. When a PVA is a combination of two or more PVAs, an apparent viscosity-average polymerization degree of the whole PVA after blending is here regarded as a viscosity-average polymerization degree.

A POA-group modification rate S of a POA-modified vinyl acetal polymer must be 0.1 to 10 mol %. A POA-group modification rate S of a POA-modified vinyl acetal polymer is a proportion (mol %) of the molar number of units derived from an unsaturated monomer having POA groups represented by general formula (I) to the molar number of the total monomer units constituting a POA-modified vinyl acetal polymer. Even after acetalization of a POA-modified PVA, a proportion (mol %) of the molar number of units derived from an unsaturated monomer having POA groups represented by general formula (I) to the molar number of the total monomers in the molecule is unchanged. A POA-group modification rate S of the above POA-modified PVA is, therefore, equal to a POA-group modification rate S of a POA-modified vinyl acetal polymer produced from the PVA by acetalization.

A POA-group modification rate S of a POA-modified vinyl acetal polymer is preferably less than 2 mol %, more preferably 1.5 mol %. If a POA-group modification rate S is less than 0.1 mol %, the number of POA groups contained in a POA-modified vinyl acetal polymer may be too small for physical properties based on POA modification to be achieved. A POA-group modification rate S is preferably 0.2 mol % or more.

A POA-group modification rate S of a POA-modified vinyl acetal polymer can be determined from the POA-modified vinyl acetal polymer or from a PGA-modified PVA or a POA-modified vinyl ester polymer as its precursor, and in any case, it can be determined by using proton NMR. A POA-group modification rate S of a POA-modified vinyl acetal polymer can be determined from a POA-modified vinyl ester polymer by the method as described above for determining a POA-group modification rate S of a POA-modified PVA.

In a POA-modified vinyl acetal polymer of the present invention, a content of vinyl ester monomer units is preferably 0.01 to 30 mol %. If a content of vinyl ester monomer monomers is less than 0.01 mol %, intramolecular and intermolecular hydrogen bonds involving hydroxyl groups in the POA-modified vinyl acetal polymer are increased. Therefore, a slurry composition for producing a ceramic green sheet prepared therefrom may have an excessively high viscosity or a too high solubility in an organic solvent, which may cause a sheet attack phenomenon. If a content of vinyl ester monomer units is more than 30 mol %, a vinyl acetal polymer has a low glass-transition temperature and thus becomes too plastic. Thus, it may lead to deterioration in handling properties, mechanical strength and dimensional stability during thermocompression bonding process in a ceramic green sheet produced from the polymer. The lower limit of a content of vinyl ester monomer units is more preferably 0.5 mol %. The upper limit of a content of vinyl ester monomer units is more preferably 23 mol %, further preferably 20 mol %. A modified vinyl acetal polymer in which a content of vinyl ester monomer units is 0.01 to 30 mol % can be produced by acetalizing a POA-modified PVA in which a content of vinyl ester monomer units is 0.01 to 30 mol %.

In a POA-modified vinyl acetal polymer of the present invention, a content of vinyl alcohol monomer units is preferably 14 to 60 mol %. If a content of vinyl alcohol monomer units is less than 14 mol %, a ceramic green sheet produced using the polymer may have poor strength and may be so insoluble in an organic solvent so that a sheet attack phenomenon may occur. If a content of vinyl alcohol monomer units is more than 65 mol %, intramolecular and intermolecular hydrogen bonds involving hydroxyl groups in the POA-modified vinyl acetal polymer are increased. Therefore, a slurry composition for producing a ceramic green sheet prepared therefrom may have an excessively high viscosity.

A POA-modified vinyl acetal polymer of the present invention can contain α-olefin units as a copolymerization component as long as it does not impair the spirit of the present invention. A content of the α-olefin units is preferably 1 to 20 mol %. If a content of the α-olefin units is less than 1 mol %, involvement of α-olefin units may become ineffective, and the content of more than 20 mol % leads to excessive hydrophobicity and thus a sheet or film such as a thin ceramic green sheet prepared therefrom may have inadequate mechanical strength and dispersibility may be reduced in a ceramic green sheet prepared.

There are no particular restrictions to a process for producing a POA-modified vinyl acetal polymer of the present invention, and suitably it can be produced by acetalizing a POA-modified PVA. Acetalization processes are generally categorized into one-step and two-step processes, any of which can be employed.

A two-step process is a procedure where saponification of a vinyl ester polymer and acetalization of a PVA produced are conducted in separate reactors. Furthermore, two-step processes are generally categorized into precipitation processes and solution processes. A preferable precipitation process is a process where using an aqueous solution of a POA-modified PVA, a POA-modified PVA is acetalized in a water-based solvent at a low temperature, a POA-modified vinyl acetal polymer is precipitated and then after a temperature of the system is increased, the reaction is aged (completion of the acetalization reaction and rearrangement of an acetalized moiety). In a solution process, a PVA is acetalized in an alcoholic solvent such as isopropanol or a mixture thereof with, for example, water at an elevated temperature and then, for example, water is added to the system to precipitate a vinyl acetal polymer. Meanwhile, in a one-step process, saponification of a vinyl ester polymer and acetalization of a PVA produced are conducted in one pot.

Among the acetalization processes described above, a precipitation process will be further specifically described. A 3 to 15% by weight aqueous solution of a POA-modified PVA is controlled to a temperature range of 80 to 100° C. and then the solution is gradually cooled over 10 to 60 min. After cooling to −10 to 40° C., an aldehyde and an acid catalyst are added and an acetalization reaction is conducted while keeping a temperature constant for 10 to 300 min. Here, the amount of the aldehyde is preferably 10 to 150 parts by weight based on 100 parts by weight of the POA-modified PVA. Then, the reaction is heated to a temperature of 15 to 80° C. over 30 to 200 min, and the temperature is preferably kept for 0 to 360 min for aging the reaction. Then, the reaction solution is suitably cooled to room temperature and washed with water followed by addition of a neutralizing agent such as an alkali, and the product is washed and dried to give a targeted modified vinyl acetal polymer.

Examples of aldehydes which can be used in an acetalization reaction include aliphatic aldehydes such as formaldehyde (including paraformaldehyde), acetaldehyde (including paraacetaldehyde), propionaldehyde, butylaldehyde, isobutylaldehyde, 2-ethylbutylaldehyde, valeraldehyde, pivalaldehyde, amylaldehyde, hexylaldehyde, heptylaldehyde, 2-ethylhexylaldehyde, octylaldehyde, nonylaldehyde, decylaldehyde, dodecylaldehyde; alicyclic aldehydes such as cyclopentanealdehyde, methylcyclopentanealdehyde, dimethylcyclopentanealdehyde, cyclohexanealdehyde, methylcyclohexanealdehyde, dimethylcyclohexanealdehyde and cyclohexaneacetaldehyde; cyclic unsaturated aldehydes such as cyclopentenealdehyde and cyclohexenealdehyde; aromatic or unsaturated-bond containing aldehydes such as benzaldehyde, 2-methylbenzaldehyde, 3-methylbenzaldehyde, 4-methylbenzaldehyde, dimethylbenzaldehyde, methoxybenzaldehyde, phenylacetaldehyde, β-phenylpropionaldehyde, cuminaldehyde, naphthylaldehyde, anthraldehyde, cinnamaldehyde, crotonaldehyde, acroleinaldehyde and 7-octen-1-al; and heterocyclic aldehydes such as furfural and methylfurfural.

Among these, an aldehyde having 2 to 8 carbon atoms is preferably used. Examples of an aldehyde having 2 to 8 carbon atoms include acetaldehyde, propionaldehyde, n-butylaldehyde, isobutylaldehyde, 3-methylbutanal, n-hexylaldehyde, 2-ethylbutylaldehyde, octylaldehyde and 2-ethylhexylaldehyde, which can be used alone or in combination of two or more. Among these, an aldehyde having 4 to 6 carbon atoms is preferable, and n-butylaldehyde is particularly preferable.

An aldehyde having a functional group such as a hydroxyl group, a carboxyl group, a sulfonyl group and a phosphate group can be used as long as it does not impair the features of the present invention. Examples of such an aldehyde include hydroxy-containing aldehydes such as hydroxyacetaldehyde, hydroxypropionaldehyde, hydroxybutylaldehyde, hydroxypentylaldehyde, salicylaldehyde, p-hydroxybenzaldehyde, m-hydroxybenzaldehyde and dihydroxybenzaldehyde; and acid-containing aldehydes such as glyoxylic acid, 2-formylacetic acid, 3-formylpropionic acid, 5-formylpentanoic acid, 4-formylphenoxyacetic acid, 2-carboxybenzaldehyde, 4-carboxybenzaldehyde, 2,4-dicarboxybenzaldehyde, benzaldehyde-2-sulfonic acid, benzaldehyde-2,4-disulfonic acid, 4-formylphenoxysulfonic acid, 3-formyl-1-propanesulfonic acid, 7-formyl-1-heptanesulfonic acid and 4-formylphenoxyphosphic acid, and their metal salts and ammonium salts.

An aldehyde having a functional group such as an amino group, a cyano group, a nitro group and a quaternary ammonium group can be used as long as it does not impair the properties of the present invention. Examples of such an aldehyde include aminoacetaldehyde, dimethylaminoacetaldehyde, diethylaminoacetaldehyde, aminopropionaldehyde, dimethylaminopropionaldehyde, aminobutylaldehyde, aminopentylaldehyde, aminobenzaldehyde, dimethylaminobenzaldehyde, ethylmethylaminobenzaldehyde, diethylaminobenzaldehyde, pyrrolidylacetaldehyde, piperidylacetaldehyde, pyridylacetaldehyde, cyanoacetaldehyde, α-cyanopropionaldehyde, nitrobenzaldehyde, trimethyl-p-formylphenylammonium iodine, triethyl-p-formylphenylammonium iodine and trimethyl-2-formylethylammonium iodine.

An aldehyde having halogen (s) as a functional group can be used as long as it does not impair the properties of the present invention. Examples of such an aldehyde include chloroacetaldehyde, bromoacetaldehyde, fluoroacetaldehyde, chloropropionaldehyde, bromopropionaldehyde, fluoropropionaldehyde, chlorobutylaldehyde, bromobutylaldehyde, fluorobutylaldehyde, chloropentylaldehyde, bromopentylaldehyde, fluoropentylaldehyde, chlorobenzaldehyde, dichlorobenzaldehyde, trichlorobenzaldehyde, bromobenzaldehyde, dibromobenzaldehyde, tribromobenzaldehyde, fluorobenzaldehyde, difluorobenzaldehyde, trifluorobenzaldehyde, trichloromethylbenzaldehyde, tribromomethylbenzaldehyde, trifluoromethylbenzaldehyde and their alkylacetals.

In acetalization of a POA-modified PVA, a polyaldehyde such as glyoxal and glutalaldehyde can be, in addition to the above aldehyde, combined. However, when a POA-modified PVA is acetalized using a polyaldehyde, a shaped product such as a film produced therefrom may be warped due to difference in stress relaxation between crosslinked and uncrosslinked parts. Therefore, an aldehyde used is preferably a monoaldehyde alone and even when a poly aldehyde group is used, the amount thereof is preferably less than 0.005 mol %, more preferably less than 0.003 mol % based on the vinyl alcohol units of the POA-modified PVA.

In acetalization, an alkylacetal of the aldehyde described above can be similarly used.

There are no particular restrictions to an acid catalyst used for acetalization, and either of organic and inorganic acids can be used, including acetic acid, para-toluenesulfonic acid, nitric acid, sulfuric acid and hydrochloric acid. Among these, hydrochloric acid, sulfuric acid and nitric acid are preferable, and hydrochloric acid and nitric acid are more preferable.

Examples of an application of a POA-modified vinyl acetal polymer of the present invention include, but not limited to, ceramic green sheets and binders for an internal electrode and paints, inks, adhesives, coating materials such as powdered paints and heat-developing photosensitive materials.

To a POA-modified vinyl acetal polymer of the present invention, additives can be added, including an antioxidant, an ultraviolet absorber, a plasticizer, an adhesion-improving agent, a heat-ray absorber, a pigment, a filler and a flow modifier, depending on an application. These additives can be added during production of a POA-modified vinyl acetal polymer or before supplying the polymer to various applications after the production.

There are no particular restrictions to the type of a plasticizer added to a vinyl acetal polymer of the present invention as long as it is highly compatible to a vinyl acetal polymer. Examples include phthalic acid plasticizers such as dioctyl phthalate, benzyl butyl phthalate, dibutyl phthalate, dihexyl phthalate, di(2-ethylhexyl) phthalate (DOP) and di(2-ethylbutyl)phthalate; adipic acid plasticizers such as dihexyl adipate and di(2-ethylhexyl) adipate (DOA); glycol plasticizers such as ethyleneglycol, diethyleneglycol and triethyleneglycol; glycol ester plasticizers such as triethyleneglycol dibutyrate, triethyleneglycol di(2-ethylbutyrate) and triethyleneglycol di(2-ethylhexanoate); phosphoric acid plasticizers such as tricresyl phosphate, tributyl phosphate and triethyl phosphate. These can be used alone or in combination of two or more.

A composition of the present invention contains a POA-modified vinyl acetal polymer of the present invention and additives or a solvent. Such additives include those which can be added to a POA-modified vinyl acetal polymer, and among others, a plasticizer is suitable. Such a solvent can be, for example, an organic solvent.

Examples of such an organic solvent include, but not limited to, ketones such as acetone, methyl ethyl ketone, dipropyl ketone and diisobutyl ketone; alcohols such as methanol, ethanol, isopropanol and butanol; aromatic hydrocarbons such as toluene and xylene; esters such as methyl propionate, ethyl propionate, butyl propionate, methyl butanate, ethyl butanate, butyl butanate, methyl pentanate, ethyl pentanate, butyl pentanate, methyl hexanate, ethyl hexanate, butyl hexanate, 2-ethylhexyl acetate and 2-ethylhexyl butyrate; glycols such as methyl cellosolve, ethyl cellosolve, butyl cellosolve, α-terpineol, butylcellosolve acetate and butylcarbitol acetate; and terpenes. These organic solvents can be used alone or in combination of two or more.

Among the compositions described above, preferred is a slurry composition for a ceramic green sheet containing a POA-modified vinyl acetal polymer of the present invention, a ceramic powder and an organic solvent. When a POA-modified vinyl acetal polymer of the present invention is dissolved in an alcoholic solvent such a 1:1 mixture of ethanol and toluene or ethanol which is generally used in a manufacturing process for a ceramic green sheet, a solution viscosity does not become too high. Thus, the slurry composition for a ceramic green sheet has adequate dispersibility and coating properties. In this regard, the slurry composition is particularly useful.

A content of a POA-modified vinyl acetal polymer in a slurry composition for a ceramic green sheet of the present invention is suitably 3 to 30% by weight based on the total amount of the slurry composition for the ceramic green sheet of the present invention. If a content of a POA-modified vinyl acetal polymer is less than 3% by weight, the amount of a POA-modified vinyl acetal polymer dispersed over the whole ceramic powder is insufficient, so that film formability of a ceramic green sheet obtained is deteriorated or plasticity of a ceramic green sheet is reduced, which may lead to cracks after firing. If a content of a POA-modified vinyl acetal polymer is more than 30% by weight, a slurry composition for a ceramic green sheet of the present invention has an excessively high viscosity, which may lead to reduced dispersibility and tendency to remaining of a carbon component after degreasing and firing of a laminate capacitor produced from the ceramic green sheet. The content is more preferably 3 to 20% by weight.

A slurry composition for a ceramic green sheet of the present invention can contain, in addition to the above, an acrylic polymer or a cellulose polymer as a binder resin. When the composition contains an acrylic polymer, a cellulose polymer or the like as a binder resin, the lower limit of a content of the above POA-modified vinyl acetal polymer in the whole binder resin is preferably 30% by weight. If it is less than 30% by weight, a ceramic green sheet produced may have insufficient mechanical strength or thermocompression bonding ability.

Examples of the above ceramic powder include, but not limited to, powders of alumina, zirconia, aluminum silicate, titanium oxide, zinc oxide, barium titanate, magnesia, sialon, spinel mullite, crystallized glass, silicon carbide, silicon nitride and aluminum nitride. These ceramic powders can be used alone or in combination of two or more. The ceramic powder can contain a glass frit such as $MgO$—$SiO_2$—$CaO$, $B_2O_2$—$SiO_2$, $PbO$—$B_2O_2$—$SiO_2$, $CaO$—$SiO_2$—$MgO$—$B_2O_2$ and $PbO$—$SiO_2$—$B_2O_2$—$CaO$.

The upper limit of a content of a ceramic powder based on the total amount of a slurry composition for a ceramic green sheet of the present invention is 80% by weight and its lower limit is preferably 17% by weight. If it is less than 17% by weight, a viscosity is so reduced that handling properties during forming a ceramic green sheet may be deteriorated. The lower limit of a content of a ceramic powder is more preferably 30% by weight. If a content of a ceramic powder is more than 80% by weight, a viscosity of a slurry composition for a ceramic green sheet becomes too high, leading to tendency to deterioration in kneading properties.

An organic solvent contained in a slurry composition for a ceramic green sheet of the present invention can be selected from those as an organic solvent used for a composition of the present invention. These organic solvents can be used alone or in combination of two or more. Among these, a mixed solvent of toluene and ethanol, ethanol, α-terpineol, butylcellosolve acetate and butylcarbitol acetate are suitable because of their good handling properties.

The upper limit of a content of an organic solvent based on the total amount of a slurry composition for a ceramic green sheet of the present invention is preferably 80% by weight and the lower limit is preferably 17% by weight. Within the above range, a slurry composition for a ceramic green sheet of the present invention can have appropriate kneading properties. If it is more than 80% by weight, a viscosity becomes so reduced, leading to tendency to deterioration in handling properties during forming a ceramic green sheet. If a content of an organic solvent is less than 17% by weight, a slurry composition for a ceramic green sheet may become so viscous that kneading properties tend to be deteriorated. The lower limit of a content of an organic solvent is more preferably 20% by weight.

A slurry composition for a ceramic green sheet can contain known additives such as a plasticizer, a lubricant, a dispersant, an antistatic, an antioxidant, a deflocculant, a wetting agent and an antifoaming agent as long as it does not impair the effects of the present invention.

There are no particular restrictions to the type of the plasticizer added to a slurry composition for a ceramic green sheet of the present invention as long as it is highly compatible to a POA-modified vinyl acetal polymer, and examples are those described as a plasticized added to a vinyl acetal polymer of the present invention. These can be used alone or in combination of two or more. The amount of the plasticizer is, but not limited to, preferably 0.1 to 10% by weight, more preferably 1 to 8% by weight based on the total amount of the slurry composition for a ceramic green sheet. Among these, DOP, DOA and triethyleneglycol 2-ethylhexyl are suitably used because they are less volatile and sheet flexibility can be easily maintained.

There are no particular restrictions to a process for preparing a slurry composition for a ceramic green sheet using a POA-modified vinyl acetal polymer of the present invention, and an example is a process where a binder resin containing the above POA-modified vinyl acetal polymer, a ceramic powder, an organic solvent and various additives which are added as necessary, are blended using a blending machine. Examples of such a blending machine include various blenders such as a ball mill, a blender mill and a triple roll mill.

Furthermore, since a slurry composition for a ceramic green sheet of the present invention has the properties as described above, the slurry composition for a ceramic green sheet of the present invention can provide a thin ceramic green sheet having adequate mechanical strength and flexibility. A suitable embodiment of the present invention is a ceramic green sheet produced using a slurry composition for a ceramic green sheet of the present invention.

There are no particular restrictions to a process for producing a ceramic green sheet of the present invention, and any of known production processes can be employed. An exemplary process is a process where a slurry composition for a ceramic green sheet of the present invention is, as necessary, defoamed and applied to a peelable support such as a polyethylene terephthalate film, as a film, and then a solvent is evaporated by, for example, heating and then the film is peeled from the support.

Another suitable embodiment of the present invention is a laminated ceramic capacitor produced using a ceramic green sheet of the present invention. More preferably, the laminated ceramic capacitor is produced using a ceramic green sheet of the present invention and a conductive paste, and further preferably, it is a laminate of ceramic green sheets of the present invention on which a conductive paste is applied.

There are no particular restrictions to a process for producing a laminated ceramic capacitor of the present invention, and it can be produced by any of known manufacturing processes. An exemplary process which can be employed is a process where a plurality of a ceramic green sheet of the present invention on which a conductive paste to be an internal electrode is applied by screen printing or the like are stacked and then thermocompressed to give a laminate, and a binder component and the like contained in the laminate are removed by thermal decomposition (degreasing), the laminate is fired to give a ceramic firing product and an outer electrode is formed by firing on the end face of the ceramic firing product.

The present invention will be further described in detail with reference to, but not limited to, Examples. In these examples, "%" and "part (s)" mean "% by weight" and "part (s) by weight", respectively, unless otherwise stated.

Physical properties of a vinyl butyral polymer were determined by the following methods.

The Amount of Vinyl Acetate Units, the Amount of Vinyl Alcohol Units and a Butyralization (Acetalization) Degree of a Vinyl Butyral Polymer Calculated from a proton NMR spectrum.

Glass-Transition Temperature

Measured using a DSC (differential scanning calorimeter) "EXTAR6000 (RD220)" from Seiko Instruments Inc. Under nitrogen, a vinyl butyral polymer was heated from 30° C. to 150° C. at a temperature-increase rate of 10° C./min, cooled to 30° C., and then again heated to 150° C. at a temperature-increase rate of 10° C./min. A measured temperature during the re-heating process was recorded as a glass transition temperature.

Haze

To a mixed solvent of 10 parts by weight of toluene and 10 parts by weight of ethanol were added 10 parts by weight of vinyl butyral polymer and 2 parts by weight of dibutyl phthalate as a plasticizer, and the mixture was mixed with stirring to give a solution. To a transparent polyester film (Toyobo Co., Ltd., "Ester A-4140") with a thickness of 50 μm was cast the above solution to such a thickness that its thickness was to be 200 μm after drying, and the film was dried at 60 to 80° C. for 4 hours using a hot-air dryer. After leaving it at 20° C. for one day, the film was cut into a 25 mm×50 mm test piece. Using this test piece, haze was determined in accordance with JIS K7105.

Production of a Ceramic Green Sheet

In a mixed solvent of 10 parts by weight of toluene and 10 parts by weight of ethanol was dissolved 10 parts by weight of vinyl butyral polymer by mixing with stirring to give a solution. To the solution was added 2 parts by weight of dibutyl phthalate as a plasticizer and the mixture was mixed with stirring. To the resulting solution was added 100 parts by weight of alumina powder (average particle size: 1 μm) as a ceramic powder, and the mixture was mixed for 48 hours using a ball mill to give a ceramic slurry in which alumina powder was dispersed. This ceramic slurry was applied to a mold-release treated polyester film to a thickness of about 50 μm, and was air-dried at an ambient temperature for 30 min and then dried in a hot-air dryer at 60 to 80° C. for one hour for evaporating the organic solvent to give a ceramic green sheet with a thickness of 30 μm.

Production of a Conductive Paste

A conductive paste was prepared by mixing 100 parts by weight of nickel powder (Mitsui Mining And Smelting Company, Limited, "2020SS") as a conductive powder, 5 parts by weight of ethyl cellulose (the Dow Chemical Company, "STD-100") and 60 parts by weight of terpineol-C (Nippon Terpene Chemicals, Inc.) as a solvent and kneading the mixture by a three-roll mill.

Production of a Laminated Ceramic Capacitor

To one side of a ceramic green sheet produced by the above production process was applied a conductive paste prepared by screen printing, and it was dried to form a conductive layer with a thickness of about 1.0 μm. The ceramic green sheet having the conductive layer was cut into 5 cm×5 cm pieces, and 100 pieces were stacked and heated and compression-bonded at a temperature of 70° C. and a pressure of 150 kg/cm$^2$ for 10 min, to give a laminate. Under a nitrogen atmosphere, the resulting laminate was heated to 400° C. at a temperature-increase rate of 3° C./min, kept at the temperature for 5 hours, further heated to 1350° C. at a temperature-increase rate of 5° C./min and kept at the temperature for 10 hours, to give a laminated ceramic capacitor.

Evaluation of Dispersibility

Using a grind meter (Taiyu Kizai, groove depth: 0 to 25 μm), dispersibility of ceramic particles in a ceramic green sheet was measured and evaluated in the following three rating categories.

A: No ceramic aggregates are observed.

B: No ceramic aggregates with a particle size of 5 μm or more are observed.

C: Ceramic aggregates with a particle size of 5 μm or more are observed.

Evaluation of Strength of a Ceramic Green Sheet

Using a type 3 dumbbell-shaped test piece in accordance with JIS K6251, strength of a ceramic green sheet at rupture under the measurement conditions of a measurement temperature of 20° C. and a tension rate of 10 mm/min using a tensile tester (Shimadzu Corporation, "Autograph").

Evaluation of Flexibility of a Ceramic Green Sheet

For a ceramic green sheet wrapping around a 5 mmϕ rod, cracks and breakings were visually checked.

A: no cracks or breakings are observed.

B: Some cracks are observed.

C: Some breakings are observed.

D: Breakings are observed.

Production Example 1

Production of PVA1

In a 3-liter reactor equipped with a stirrer, a reflux condenser, a nitrogen inlet, a monomer dropping port and a port for adding an initiator were charged 750 g of vinyl acetate, 250 g of methanol and 3.3 g of an unsaturated monomer having POA groups (this monomer is represented by general formula (II) wherein $R^1$ to $R^4$, X, m and n are as shown in Table 1 and units A and B are arranged as a block), and the atmosphere of the system was replaced with nitrogen by bubbling nitrogen for 30 min. Furthermore, as a delay solution, monomer A was dissolved in methanol to prepare a solution with a concentration of 20%, whose atmosphere was replaced with nitrogen gas by nitrogen bubbling. The reactor was heated to an internal temperature of 60° C., at which 0.25 g of 2,2'-azobisisobutyronitrile (AIBN) was added to initiate polymerization. While keeping a monomer composition (a ratio of vinyl acetate to monomer A) in a polymerization solution constant by adding a delay solution dropwise, polymerization was conducted at 60° C. for 3 hours and then the solution was cooled to terminate the polymerization. The total amount of monomer A added until polymerization termination was 17.6 g. A solid concentration at the time of polymerization termination was 26.8%. Subsequently, the unreacted vinyl acetate monomer was removed at 30° C. under a reduced pressure while methanol was occasionally added, to prepare a solution of POA-modified polyvinyl acetate (POA-modified PVAc) in methanol (concentration: 35%). Furthermore, to the solution was added methanol to prepare a solution of POA-modified PVAc in methanol, to 453.3 g (the amount of POA-modified PVAc in the solution was 100.0 g) which was added 16.7 g of an alkali solution (a 10% solution of sodium hydroxide in methanol) to initiate saponification (a POA-modified PVAc concentration in the saponification solution was 20%, and a molar ratio of sodium hydroxide to vinyl acetate units in POA-modified PVAc was 0.03). Since a gelatinous material was formed about one minute after addition of the alkali solution, the material was crushed by a pulverizer and the system was left at 40° C. for one hour to allow saponification to proceed, and then 500 g of methyl acetate was added to neutralize the remaining alkali. After confirming completion of neutralization using a phenolphthalein indicator, the mixture was filtrated to give a white solid, to which was added 2000 g of methanol, and then the mixture was left at room temperature for 3 hours for washing. The above washing procedure was repeated three times and then a white solid after centrifugal deliquoring was left in an oven at 65° C. for 2 days to give POA-modified PVA (PVA1). A viscosity-average polymerization degree P of PVA1 was 1700, a saponification degree was 98.9 mol %, and a POA-group modification rate S was 0.4 mol %.

Production of PVAs 2 to 21 and 24 to 31

Various POA-modified PVAs were produced as described in Example 1, except that the amounts of vinyl acetate and methanol (before initiation of polymerization), the type, the amount and a polymerization rate of an unsaturated monomer having POA groups used in the polymerization (the monomer is represented by general formula (II), wherein $R^1$ to $R^4$, X, m and n are as shown in Table 1), a concentration of POA-modified PVAc during saponification and a molar ratio of sodium hydroxide to vinyl acetate units as appropriate.

EXAMPLE 1

Synthesis of a POA-Modified Vinyl Acetal Polymer

As shown in Tables 1 and 2, PVA1 was prepared as a POA-modified PVA with a polymerization degree of 1700, a saponification degree of 98.9 mol %, a POA-group modification rate of 0.4 mol % (in general formula (III), $R^1$=H, $R^2$=H, $R^4$=$CH_3$, $R^5$=H, m=2, n=13). In an internal 5-liter glass vessel equipped with a reflux condenser, a thermometer and an anchor-type stirring blade were charged 193 g of POA-modified PVA and 2900 g of water, and the mixture was stirred at 90° C. or higher for about 2 hours for complete dissolving. The POA-modified PVA solution was cooled to 38° C. with stirring. Then, to the solution were added 201 g of 35% concentration hydrochloric acid and 112 g of n-butylaldehyde, and the solution was cooled to 20° C. or less, to initiate acetalization of PVA. The temperature was kept for 15 min to precipitate POA-modified vinyl butyral polymer. Then, the solution was heated to 30° C., kept at 30° C. for 5 hours, and then cooled to room temperature. The precipitated resin was filtered and washed 10 times with 100 volumes of ion exchanged water based on the volume of the resin. To the resin was added a 0.3% by weight sodium hydroxide solution for neutralization. It was kept at 70° C. for 5 hours, then re-washed 10 times with 10 volumes of ion exchanged water, dehydrated, and then dried at 40° C. under a reduced pressure for 18 hours to give POA-modified vinyl butyral polymer. In the POA-modified vinyl butyral polymer thus obtained, a butyralization (acetalization) degree was 70.0 mol %, the amount of vinyl acetate units based on the total monomer units was 1.1 mol %, and the amount of vinyl alcohol units based on the total molar number of monomer units was 28.5 mol %. The POA-modified vinyl butyral polymer obtained was evaluated as described above. The composition and the evaluation results of the POA-modified vinyl butyral polymer are shown in Table 2, and the evaluation results of the ceramic green sheet are shown in Table 3, respectively. The vinyl butyral polymer and the plasticizer used for preparation of a test piece for haze determination were satisfactorily dissolved in the mixed solvent. Furthermore, a laminated ceramic capacitor could be smoothly produced by using the above ceramic green sheet. The laminated ceramic capacitor produced satisfactorily operated.

EXAMPLES 2 to 23

POA-modified vinyl butyral polymers were produced and evaluated as described in Example 1, except that PVA1 was replaced with POA-modified PVAs shown in Tables 1 and 2 and the acetalization conditions were changed. The results are shown in Tables 2 and 3. In these examples, the vinyl butyral polymer and the plasticizer used for preparing a test piece for haze determination were satisfactorily dissolved in a mixed solvent. Furthermore, laminated ceramic capacitors could be smoothly produced by using the above ceramic green sheets. The laminated ceramic capacitors produced satisfactorily operated.

COMPARATIVE EXAMPLES 1 and 2

Vinyl butyral polymers were produced and evaluated as described in Example 1, substituting unmodified PVAs shown in Tables 1 and 2 for PVA1. The results are shown in Tables 2 and 3.

COMPARATIVE EXAMPLES 3 to 13

POA-modified vinyl butyral polymers were produced and evaluated as described in Example 1, except that POA-modified PVA was replaced as shown in Table 1 and the acetalization conditions were changed. The results are shown in Tables 2 and 3.

COMPARATIVE EXAMPLE 14

A modified vinyl butyral polymer was produced and evaluated as described in Example 1, substituting a modified PVA having a side chain represented by general formula (IV) described in Patent Reference No. 1 (its composition is shown in Table 1) for POA-modified PVA. The results are shown in Tables 2 and 3.

[Chemical formula 7]

(IV)

TABLE 1

| | | Viscosity-average polymerization degree P | Saponification degree (mol %) | Modification rate S (mol %) | R¹ | R² | R³ | R⁴ | X | m | n |
|---|---|---|---|---|---|---|---|---|---|---|---|
| Production Example 1 | PVA1 | 1700 | 98.9 | 0.4 | H | H | H | CH₃ | —CO—NH—CH₂—* | 2 | 13 |
| Production Example 2 | PVA2 | 1700 | 98.9 | 0.2 | H | H | H | CH₃ | —CO—NH—CH₂—* | 2 | 13 |
| Production Example 3 | PVA3 | 1700 | 98.9 | 0.8 | H | H | H | CH₃ | —CO—NH—CH₂—* | 2 | 13 |
| Production Example 4 | PVA4 | 1700 | 99.0 | 1.5 | H | H | H | CH₃ | —CO—NH—CH₂—* | 2 | 13 |
| Production Example 5 | PVA5 | 1700 | 88.0 | 0.2 | H | H | H | CH₃ | —CO—NH—CH₂—* | 2 | 13 |
| Production Example 6 | PVA6 | 1700 | 92.0 | 0.2 | H | H | H | CH₃ | —CO—NH—CH₂—* | 2 | 13 |
| Production Example 7 | PVA7 | 3500 | 98.9 | 0.4 | H | H | H | CH₃ | —CO—NH—CH₂—* | 2 | 13 |
| Production Example 8 | PVA8 | 2400 | 98.8 | 0.4 | H | H | H | CH₃ | —CO—NH—CH₂—* | 2 | 13 |
| Production Example 9 | PVA9 | 1000 | 98.9 | 0.4 | H | H | H | CH₃ | —CO—NH—CH₂—* | 2 | 13 |
| Production Example 10 | PVA10 | 500 | 99.0 | 0.4 | H | H | H | CH₃ | —CO—NH—CH₂—* | 2 | 13 |
| Production Example 11 | PVA11 | 200 | 99.0 | 0.4 | H | H | H | CH₃ | —CO—NH—CH₂—* | 2 | 13 |
| Production Example 12 | PVA12 | 1700 | 99.1 | 0.4 | H | H | H | CH₃ | —CO—NH—CH₂—* | 2 | 9 |
| Production Example 13 | PVA13 | 1700 | 99.1 | 0.4 | H | H | H | CH₃ | —CO—NH—CH₂—* | 2 | 6 |
| Production Example 14 | PVA14 | 1700 | 99.0 | 0.4 | H | H | H | CH₃ | —CO—NH—CH₂—* | 2 | 4 |
| Production Example 15 | PVA15 | 1700 | 99.1 | 0.4 | H | H | H | CH₃ | —CO—NH—CH₂—* | 2 | 2 |
| Production Example 16 | PVA16 | 1700 | 98.9 | 0.4 | H | H | H | CH₃ | —CO—NH—CH₂—* | 2 | 16 |
| Production Example 17 | PVA17 | 1700 | 99.1 | 0.4 | H | H | H | CH₃ | —CO—NH—CH₂—* | 2 | 19 |
| Production Example 18 | PVA18 | 1700 | 99.0 | 0.4 | H | H | H | CH₃ | —CO—NH—CH₂—* | 2 | 21 |
| Production Example 19 | PVA19 | 1700 | 99.0 | 0.4 | H | H | H | H | —O— | 2 | 10 |
| Production Example 20 | PVA20 | 1700 | 99.0 | 0.4 | H | H | H | CH₂—COONa | —O—CH₂—* | 2 | 12 |
| Production Example 21 | PVA21 | 1700 | 98.9 | 3.0 | H | H | H | CH₃ | —CO—NH—CH₂—* | 2 | 13 |
| Production Example 22 | PVA22 | 1700 | 98.9 | — | — | — | — | — | — | — | — |
| Production Example 23 | PVA23 | 3500 | 98.9 | — | — | — | — | — | — | — | — |
| Production Example 24 | PVA24 | 100 | 99.0 | 0.4 | H | H | H | CH₃ | —CO—NH—CH₂—* | 2 | 13 |
| Production Example 25 | PVA25 | 1700 | 99.0 | 0.4 | H | H | H | CH₃ | —CO—NH—CH₂—* | 20 | 0 |
| Production Example 26 | PVA26 | 1700 | 98.9 | 0.4 | CH₃ | H | H | CH₃ | —CO—NH—CH₂—* | 20 | 0 |
| Production Example 27 | PVA27 | 1700 | 98.9 | 0.4 | — | H | H | CH₃ | —CO—NH—CH₂—* | 0 | 21 |
| Production Example 28 | PVA28 | 1700 | 99.0 | 0.4 | H | H | H | H | —O—CH₂—* | 15 | 0 |
| Production Example 29 | PVA29 | 1700 | 98.8 | 0.4 | CH₃ | H | H | H | —O—CH₂—* | 10 | 0 |
| Production Example 30 | PVA30 | 1700 | 99.1 | 0.4 | H | H | R₃ | H | —O— | 10 | 0 |
| Production Example 31 | PVA31 | 1700 | 99.0 | 0.4 | H | H | H | CO—CH₃ | —O—CH₂—* | 36 | 0 |
| Production Example 32 | PVA32 | 1700 | 98.9 | 4.0 | — | — | H | — | — | — | 10 |

*indicating a POA-group side

TABLE 2

| | PVA | Butyralization degree (mol %) | Amount of vinyl acetate units (mol %) | Amount of vinyl alcohol units (mol %) | Tg (° C.) | Haze (%) |
|---|---|---|---|---|---|---|
| Example 1 | PVA1 | 70.0 | 1.1 | 28.5 | 66 | 0.7 |
| Example 2 | PVA1 | 80.0 | 1.1 | 18.5 | 62 | 0.7 |
| Example 3 | PVA1 | 55.0 | 1.1 | 43.5 | 68 | 0.7 |
| Example 4 | PVA1 | 35.0 | 1.1 | 63.5 | 71 | 0.8 |
| Example 5 | PVA1 | 10.0 | 1.1 | 88.5 | 77 | 0.9 |
| Example 6 | PVA2 | 70.5 | 1.1 | 28.2 | 67 | 0.8 |
| Example 7 | PVA3 | 69.8 | 1.1 | 28.3 | 65 | 0.8 |
| Example 8 | PVA4 | 69.9 | 1.0 | 27.6 | 63 | 1.0 |
| Example 9 | PVA5 | 65.0 | 7.0 | 27.8 | 61 | 0.9 |
| Example 10 | PVA6 | 68.0 | 4.0 | 27.8 | 62 | 0.7 |
| Example 11 | PVA7 | 70.0 | 1.1 | 28.5 | 64 | 0.8 |
| Example 12 | PVA8 | 70.0 | 1.2 | 28.4 | 63 | 0.7 |
| Example 13 | PVA9 | 70.1 | 1.1 | 28.4 | 64 | 0.9 |
| Example 14 | PVA10 | 69.9 | 1.0 | 28.7 | 64 | 0.9 |
| Example 15 | PVA11 | 70.1 | 1.0 | 28.5 | 63 | 1.0 |
| Example 16 | PVA12 | 69.8 | 0.9 | 28.9 | 68 | 0.9 |
| Example 17 | PVA13 | 70.2 | 0.9 | 28.5 | 70 | 0.7 |
| Example 18 | PVA14 | 70.3 | 1.0 | 28.3 | 71 | 0.8 |
| Example 19 | PVA16 | 69.7 | 1.1 | 28.8 | 64 | 0.8 |
| Example 20 | PVA17 | 69.6 | 0.9 | 29.1 | 62 | 0.7 |
| Example 21 | PVA19 | 70.1 | 1.0 | 28.5 | 70 | 0.9 |
| Example 22 | PVA20 | 70.0 | 1.0 | 28.6 | 64 | 0.9 |
| Example 23 | PVA21 | 67.2 | 1.1 | 28.7 | 60 | 0.7 |
| Comparative Example 1 | PVA22 | 70.2 | 1.1 | 28.7 | 73 | 0.6 |
| Comparative Example 2 | PVA23 | 70.3 | 1.1 | 28.6 | 63 | 0.7 |
| Comparative Example 3 | PVA24 | 69.9 | 1.0 | 28.7 | 73 | 0.9 |
| Comparative Example 4[1] | PVA1 | — | 1.2 | 28.5 | 73 | — |
| Comparative Example 5 | PVA15 | 70.0 | 0.9 | 28.7 | 74 | 0.9 |
| Comparative Example 6 | PVA18 | 69.7 | 1.0 | 28.9 | 68 | 1.2 |
| Comparative Example 7 | PVA25 | 70.2 | 1.1 | 28.3 | 67 | 1.2 |
| Comparative Example 8 | PVA26 | 70.0 | 1.1 | 28.5 | 66 | 1.1 |
| Comparative Example 9 | PVA27 | 70.0 | 1.1 | 28.5 | 65 | 1.2 |
| Comparative Example 10 | PVA28 | 70.3 | 1.0 | 28.3 | 70 | 1.3 |
| Comparative Example 11 | PVA29 | 69.8 | 1.2 | 28.6 | 71 | 1.3 |
| Comparative Example 12 | PVA30 | 69.9 | 0.9 | 28.8 | 70 | 1.2 |
| Comparative Example 13 | PVA31 | 70.0 | 1.0 | 28.6 | 68 | 1.2 |
| Comparative Example 14 | PVA32 | 66.5 | 1.1 | 28.4 | 66 | 2.9 |

[1] Comparative Example 4 was not evaluated because a slurry or a green sheet was not prepared due to poor solubility of a vinyl butyral polymer.

TABLE 3

| | Dispersibility | Strength at rupture (g/cm$^2$) | Plasticity |
|---|---|---|---|
| Example 1 | A | 31 | A |
| Example 2 | A | 29 | A |
| Example 3 | A | 26 | B |
| Example 4 | A | 24 | C |
| Example 5 | A | 22 | C |
| Example 6 | A | 29 | A |
| Example 7 | A | 28 | B |
| Example 8 | A | 26 | B |
| Example 9 | A | 26 | A |
| Example 10 | A | 28 | A |
| Example 11 | A | 33 | A |
| Example 12 | A | 31 | B |
| Example 13 | A | 24 | B |
| Example 14 | A | 21 | B |
| Example 15 | A | 23 | B |
| Example 16 | A | 28 | B |
| Example 17 | A | 25 | B |
| Example 18 | A | 22 | B |
| Example 19 | A | 29 | B |
| Example 20 | A | 31 | A |
| Example 21 | A | 27 | A |
| Example 22 | A | 28 | B |
| Example 23 | A | 21 | B |
| Comparative Example 1 | B | 12 | C |
| Comparative Example 2 | B | 32 | C |
| Comparative Example 3 | A | 8 | D |
| Comparative Example 4 | C | — | — |
| Comparative Example 5 | C | 12 | C |
| Comparative Example 6 | C | 19 | C |
| Comparative Example 7 | B | 16 | C |
| Comparative Example 8 | B | 15 | B |
| Comparative Example 9 | B | 17 | B |
| Comparative Example 10 | B | 16 | B |
| Comparative Example 11 | B | 17 | B |
| Comparative Example 12 | B | 16 | B |
| Comparative Example 13 | B | 15 | B |
| Comparative Example 14 | B | 28 | C |

As shown in the above examples, a vinyl acetal polymer of the present invention has a feature that a film or sheet produced therefrom has improved film strength and flexibility, as well as a feature that a resin composition therefrom is free from phase separation. A vinyl acetal polymer of the present invention is suitable for applications such as various paints, inks, adhesives, binders, coating materials such as powder coatings and thermodeveloping photosensitive materials.

The invention claimed is:

1. A polyoxyalkylene-modified vinyl acetal polymer which comprises a polyoxyalkylene group represented by formula (I) in a side chain, and which has a viscosity-average polymerization degree P of 150 to 5000, an acetalization degree of 10 to 85 mol %, and a polyoxyalkylene modification rate S of 0.1 to 10 mol %

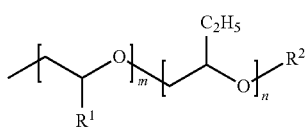
(I)

wherein $R^1$ represents a hydrogen atom or a methyl group; $R^2$ represents a hydrogen atom or an alkyl group having 1 to 8 carbon atoms; and $1 \leq m \leq 10$ and $3 \leq n \leq 20$.

2. The polyoxyalkylene-modified vinyl acetal polymer of claim 1, produced by acetalizing a polyoxyalkylene-modified vinyl alcohol polymer which comprises the polyoxyalkylene group represented by formula (I) in a side chain, and which has a viscosity-average polymerization degree P of 150 to 5000, a saponification degree of 20 to 99.99 mol % and a polyoxyalkylene modification rate S of 0.1 to 10 mol %.

3. A composition comprising the polyoxyalkylene-modified vinyl acetal polymer of claim 1.

4. A slurry composition comprising the polyoxyalkylene-modified vinyl acetal polymer of claim 1, a ceramic powder and an organic solvent.

5. A ceramic green sheet produced from the slurry composition of claim 4.

6. A laminated ceramic capacitor produced from the ceramic green sheet of claim 5.

7. A process for producing the polyoxyalkylene-modified vinyl acetal polymer of claim 1, the process comprising
copolymerizing an unsaturated monomer represented by formula (II) with a vinyl ester monomer, to obtain a polyoxyalkylene-modified vinyl ester copolymer;
saponifying the polyoxyalkylene-modified vinyl ester copolymer, to obtain a polyoxyalkylene-modified vinyl alcohol polymer; and
acetalizing the polyoxyalkylene-modified vinyl alcohol polymer

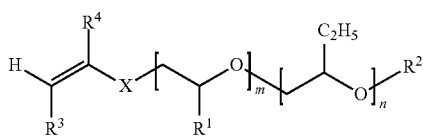
(II)

wherein $R^1$, $R^2$, m and n are as defined in formula (I); $R^3$ represents a hydrogen atom or a —COOM group, wherein M represents a hydrogen atom, an alkali metal or an ammonium group; $R^4$ represents a hydrogen atom, a methyl group or a —CH$_2$—COOM group, wherein M is as defined above; and X represents —O—, —CH$_2$—O—, —CO—, —(CH$_2$)$_k$—, —CO—O—, —CO—NR$^5$— or —CO—NR$^5$—CH$_2$—, wherein $R^5$ represents a hydrogen atom or a saturated alkyl group having 1 to 4 carbon atoms and $1 \leq k \leq 15$.

8. The process of claim 7, wherein the unsaturated monomer represented by formula (II) is an unsaturated monomer represented by formula (III)

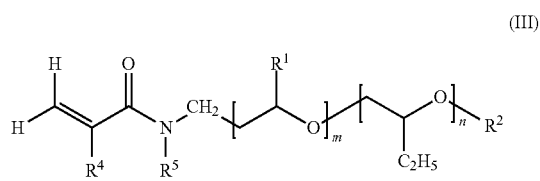
(III)

wherein $R^1$, $R^2$, $R^4$, $R^5$, m and n are as defined in formula (II).

9. The polyoxyalkylene-modified vinyl acetal polymer of claim 1, wherein $R^1$ represents a hydrogen atom.

10. The polyoxyalkylene-modified vinyl acetal polymer of claim 1, wherein $R^1$ represents a methyl group.

11. The polyoxyalkylene-modified vinyl acetal polymer of claim 1, wherein $R^2$ represents a hydrogen atom.

12. The polyoxyalkylene-modified vinyl acetal polymer of claim 1, wherein $R^2$ represents an alkyl group having 1 to 8 carbon atoms.

13. The polyoxyalkylene-modified vinyl acetal polymer of claim 1, wherein $R^1$ represents a hydrogen atom and $R^2$ represents a hydrogen atom.

14. The polyoxyalkylene-modified vinyl acetal polymer of claim 1, wherein $R^1$ represents a hydrogen atom and $R^2$ represents an alkyl group having 1 to 8 carbon atoms.

15. The polyoxyalkylene-modified vinyl acetal polymer of claim 1, wherein $R^1$ represents a methyl group and $R^2$ represents a hydrogen atom.

16. The polyoxyalkylene-modified vinyl acetal polymer of claim 1, wherein $R^1$ represents a methyl group and $R^2$ represents an alkyl group having 1 to 8 carbon atoms.

\* \* \* \* \*